US008649144B2

(12) United States Patent
Migliavacca

(10) Patent No.: US 8,649,144 B2
(45) Date of Patent: Feb. 11, 2014

(54) METHOD OF FORMING AN OVER-VOLTAGE PROTECTION CIRCUIT AND STRUCTURE THEREFOR

(75) Inventor: Paolo Migliavacca, Mauzac (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1223 days.

(21) Appl. No.: 11/671,034

(22) Filed: Feb. 5, 2007

(65) Prior Publication Data

US 2008/0186644 A1 Aug. 7, 2008

(51) Int. Cl.
*H02H 3/20* (2006.01)

(52) U.S. Cl.
USPC .......... 361/91.6

(58) Field of Classification Search
USPC .......... 361/91.6
See application file for complete search history.

(56) References Cited

U.S. PATENT DOCUMENTS

| | | | | | |
|---|---|---|---|---|---|
| 4,008,418 | A | * | 2/1977 | Murphy | 361/18 |
| 4,034,269 | A | * | 7/1977 | Wilkinson | 361/79 |
| 4,346,342 | A | * | 8/1982 | Carollo | 323/276 |
| 4,893,228 | A | * | 1/1990 | Orrick et al. | 363/98 |
| 5,189,587 | A | * | 2/1993 | Haun et al. | 361/56 |
| 5,747,975 | A | * | 5/1998 | Colandrea et al. | 323/276 |
| 5,764,041 | A | * | 6/1998 | Pulvirenti et al. | 323/282 |
| 6,573,693 | B2 | * | 6/2003 | Okamoto | 323/273 |
| 6,606,227 | B2 | * | 8/2003 | Rapsinski et al. | 361/86 |
| 6,667,606 | B2 | * | 12/2003 | Oglesbee et al. | 323/284 |
| 6,850,044 | B2 | * | 2/2005 | Hansen et al. | 323/266 |
| 7,219,022 | B2 | * | 5/2007 | Wekhande | 702/58 |
| 2007/0086530 | A1 | * | 4/2007 | Bernardon et al. | 375/257 |
| 2008/0116862 | A1 | * | 5/2008 | Yang et al. | 323/269 |

* cited by examiner

*Primary Examiner* — Stephen W Jackson
*Assistant Examiner* — Ann Hoang
(74) *Attorney, Agent, or Firm* — Robert F. Hightower

(57) ABSTRACT

In one embodiment, an over-voltage protection circuit is configured to have two control circuits that respond at different values of the input voltage.

19 Claims, 2 Drawing Sheets

10

METHOD OF FORMING AN OVER-VOLTAGE PROTECTION CIRCUIT AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures to produce over-voltage and voltage transient protection circuits that could be used to protect various types of devices such as voltage regulators. These over-voltage and voltage transient protection circuits generally included a linear regulator that used a pass transistor and an operational amplifier to control an output voltage. During a transient or over-voltage event, the over-voltage protection circuit generally disabled the linear regulator and prevented regulation until the transient or over-voltage condition was eliminated. Because the linear regulator was disabled, the linear regulator did not provide over-voltage protection and additional circuitry was required. Usually, a zener diode was coupled between the input and ground to help protect against input over-voltage conditions. However, the voltage at which the zener diode conducted was not very accurate or very controlled, thus, the voltage applied to the output could exceed the desired maximum value of the output voltage. One example of such a transient protection circuit is described in U.S. Pat. No. 4,008,418 that issued on Feb. 15, 1997 that issued to Howard E. Murphy.

Accordingly, it is desirable to have a protection circuit that more accurately regulates the output voltage, that minimizes overshoots during a transient, and that has a faster reaction time.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
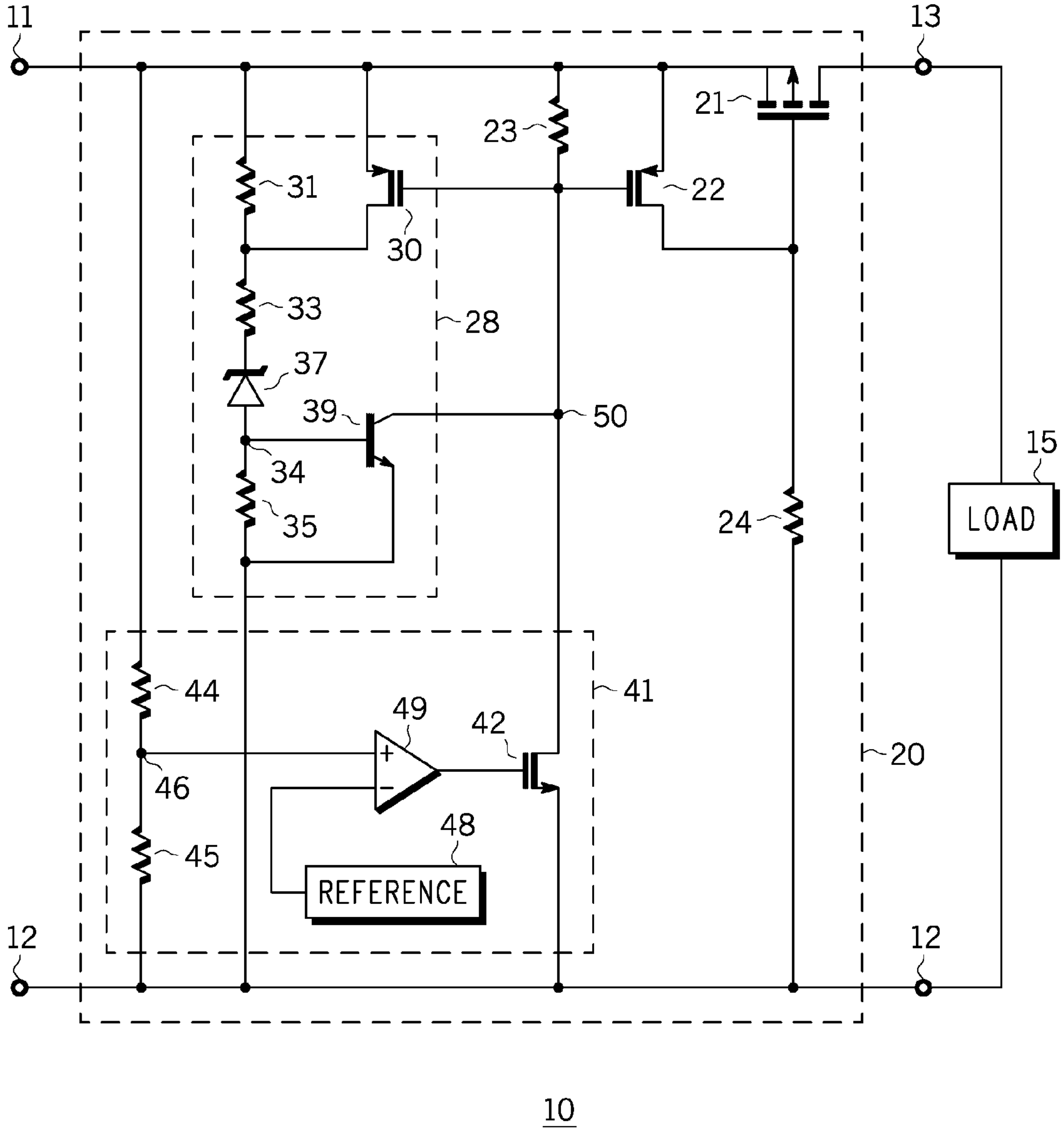
FIG. 1 schematically illustrates an embodiment of a portion of a system that includes an over-voltage protection circuit in accordance with the present invention.

FIG. 1 schematically illustrates a preferred embodiment of an over-voltage protection circuit 20 that is connected in an embodiment of a portion of a circuit 10. Over-voltage protection circuit 20 receives an input voltage between an input terminal 11 and a common return terminal 12 and provides an output voltage between an output 13 and terminal 12. For example, the input voltage to circuit 20 may be received from a wall adapter or a USB supply and load 15 may be the circuitry of a cellular telephone. A desired value of the input voltage generally has a target value within a range of values around the target value. For example, the target value may be five volts (5V) and the range of values may be plus or minus five percent (5%) around the five volts. Over-voltage protection circuit 20 generally is coupled to a load 15 that utilizes the output voltage on output 13 to operate load 15. Circuit 20 includes a first circuit that is configured to decouple output 13 from the input voltage responsively to the value of the input voltage increasing to no less than a first value and also includes a second circuit that decouples output 13 from the input voltage responsively to the value of the input voltage increasing to no less than a second value that is less than the first value. Additionally, the first circuit decouples output 13 from the input voltage responsively to the value of the input voltage increasing at a high rate and the second circuit decouples output 13 from the input voltage responsively to the value of the input voltage increasing at a slower rate.

Circuit 20 includes a pass element, such as a P-channel MOS transistor 21, that is connected in series between input terminal 11 and output 13, a fast control circuit 28, a slow control circuit 41, a disable switch such as a transistor 22, and resistors 23 and 24. Circuit 28 includes a zener diode 37, a bipolar transistor 39, a threshold adjust circuit that includes a resistor 33 and a resistor 35, and a hysteresis circuit that includes a transistor 30 and resistor 31. Circuit 41 includes a transistor 42, a comparator 49, a voltage reference generator or reference 48, and a feed forward circuit that includes resistors 44 and 45. As will be seen further hereinafter, circuit 41 has a threshold voltage that is lower than a threshold voltage of circuit 28. Additionally, circuit 41 has a slower response time than circuit 28. As a result, circuit 41 controls transistor 21 for increases in the value of the input voltage as long as the input voltage increases at a rate that is slower than the propagation delay time through circuit 41.

Figure 2:
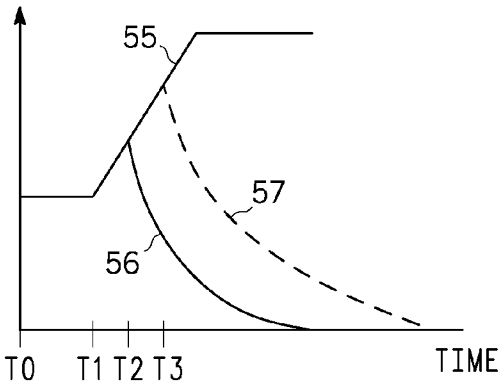
FIG. 2 is a graph having plots of the operation of some of the elements of the over-voltage protection circuit of FIG. 1 in accordance with the present invention.

FIG. 2 is a graph having plots that illustrate the input voltage and the output voltage of circuit 20 under certain operating conditions. The abscissa indicates time and the ordinate indicates increasing value of the illustrated signal. A plot 55 illustrates the value of the input voltage received between terminals 11 and 12. A plot 56 illustrates the value of the output voltage between output 13 and terminal 12 resulting from the operation of circuit 28. A plot 57 illustrates in dashed lines the value of the output voltage resulting from plot 55 if circuit 28 were omitted. This description has references to FIG. 1 and FIG. 2.

At a time T0 (FIG. 2), the input voltage is within the target range of input voltage values. A node 34 and the output of comparator 49 have substantially the value of the voltage on terminal 12, thus circuit 28 and circuit 41 are disabled and transistors 39 and 42 are both disabled. Consequently, the value of the voltage on a node 50 is controlled by resistor 23. Resistor 23 pulls node 50 and the gate voltage of transistor 22 to substantially the value of the input voltage, minus some voltage drop across resistor 23, which disables transistor 22. With transistor 22 disabled, resistor 24 couples the gate of P-channel MOS transistor 21 to substantially the value of the voltage on return terminal 12, minus some voltage drop across resistor 24, thereby enabling transistor 21. Enabling transistor 21 couples the input voltage through transistor 21 to output 13. Thus, the value of the output voltage is substantially the value of the input voltage (minus some voltage drop across transistor 21).

At a time T1, the value of the input voltage begins to increase from a value within the target range to a value that is greater than the target range over a time interval that is faster than the delay time through comparator 49. While the increase in the value of the input voltage is propagating through comparator 49, the value of the input voltage continues to increase and reaches the value of the zener voltage of diode 37. Diode 37 begins to conduct through resistors 31, 33, and 35. If the input voltage continues to increase such that diode 37 conducts a sufficient current to provide a voltage drop across resistor 35 that is substantially equal to the threshold voltage of transistor 39, transistor 39 turns on. This value of the input voltage is the threshold voltage of circuit 28. Turning on transistor 39 pulls the voltage at node 50 to substantially the value of the voltage on terminal 12, minus a voltage drop across transistor 39, thereby enabling transistor 22. Enabling transistor 22 couples substantially the input voltage to the gate of transistor 21 thereby disabling transistor 21 and decoupling output 13 from the input voltage as illustrated at a time T2. Consequently, even though the threshold voltage of circuit 41 is lower than the threshold voltage of circuit 28, circuit 28 disables transistor 21 prior to circuit 41 when the input voltage increases to a value greater than the threshold voltage of circuit 28 in a time that is less than the delay through circuit 41. This provides over-voltage protection for rapid increases in the value of the input voltage.

Plot 57 illustrates in dashed lines the effect of circuit 41 on the output voltage without the presence of circuit 28. The feed forward circuit of resistors 44 and 45 provides a sense signal at a node 46 that is representative of the value of the input voltage. If the value of the input voltage increases so that the sense signal is greater than the voltage from reference 48, the output of comparator 49 is forced high to enable transistor 42. This value of the input voltage is the threshold voltage of circuit 41. Enabling transistor 42 couples node 50 to terminal 12 thereby enabling transistor 22 and disabling transistor 21. Because the delay time through circuit 41 is greater than the time required for diode 37 to begin conducting, transistor 42 is enabled subsequent to the time at which diode 37 would be enabled as illustrated at a time T3. With circuit 28 in place and with the input voltage increasing at a very fast rate, the value of the input voltage reaches the threshold voltage of circuit 28 before comparator 49 can enable transistor 42, therefore, circuit 28 disables transistor 21. The fast rate is defined by the delay through circuit 41 and especially through comparator 49. If the increase of the input voltage from the target value to the threshold value of circuit 28 is faster than the delay time through circuit 41, including comparator 49, circuit 28 responds to the voltage increase before circuit 41.

Circuit 28 also includes a hysteresis function which minimizes false triggering and re-triggering of circuit 28 as the value of the input voltage changes around the threshold voltage of circuit 28. When the value of the input voltage reaches the threshold voltage of circuit 28 and transistor 39 is enabled, node 50 is coupled to terminal 12. Coupling node 50 to terminal 12 enables transistor 30 which shorts across resistor 31. Shorting across resistor 31 increases the amount of current through resistors 33 and 35. Consequently, when the value of the input voltage begins to decrease, the input voltage must decrease to a value that is a less than the threshold voltage of circuit 28 before transistor 39 is disabled. Thus, circuit 28 has hysteresis and the threshold voltage for enabling circuit 28 and turning on transistor 39 is greater than the value of the input voltage at which circuit 28 is disabled and transistor 39 turns-off.

Figure 3:
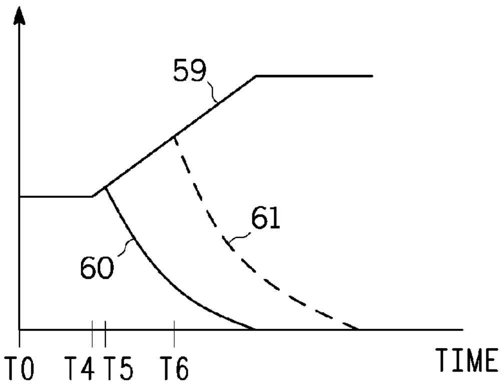
FIG. 3 is a graph having other plots of the operation of some of the elements of the over-voltage protection circuit of FIG. 1 in accordance with the present invention.

FIG. 3 is a graph having plots that illustrate the input voltage and the output voltage of circuit 20 under other operating conditions. The abscissa indicates time and the ordinate indicates increasing value of the illustrated signal. A plot 59 illustrates the input voltage received between terminals 11 and 12 increasing from the target value to no less than the threshold value of circuit 41 over a time period that is no less than the delay time through circuit 41. A plot 60 illustrates the value of the output voltage resulting from the operation of circuit 41. A plot 61 illustrates in dashed lines the value of the output voltage resulting from the operation of circuit 28 if circuit 41 were omitted. This description has references to FIG. 1 and FIG. 3.

At a time T4, the value of the input voltage is increasing from the target value to a value that is no less than the threshold value of circuit 41 over a time interval that is more than the delay time through circuit 41. As the value of the input voltage increases to no less than the threshold voltage of circuit 41, the sense signal increases to a value that is just greater than the reference voltage from reference 48 which forces the output of comparator 49 high. The high from comparator 49 enables transistor 42 which in turn enables transistor 22. Transistor 22 couples the input voltage to the gate of transistor 21 thereby disabling transistor 21 which decouples output 13 from the input voltage as illustrated at a time T5.

Because the threshold voltage of circuit 41 is lower than the threshold voltage of circuit 28 and the input voltage is increasing over a time interval that is more than the delay through circuit 41, circuit 41 disables transistor 21 prior to circuit 28. Plot 61 illustrates in dashed lines the value of the output voltage if circuit 41 were omitted and circuit 28 provided the disabling of transistor 21 for the slowly changing input voltage. Due to the higher threshold voltage of circuit 28, circuit 28 disables transistor 21 at a time T6. Plots 60 and 61 illustrate that the lower threshold voltage of circuit 41 prevents the output voltage from increasing and provides more accurate control of the value of the output voltage than the control provided by circuit 28.

In one example embodiment, the typical threshold voltage of circuit 28 related to an input voltage value of approximately 6.0 volts and the typical threshold voltage of circuit 41 related to an input voltage of approximately 5.5 volts. The delay time through circuit 41 and comparator 49 was approximately three (3) micro-seconds and the switching time of diode 37 was approximately 0.7 micro-seconds. Because the zener voltage of diode 37 may vary from one semiconductor die to another semiconductor die due to variations in semiconductor processing, the zener voltage may vary from 5.0 volts to 6.0 volts for a typical zener voltage value of 5.5 volts. In order to ensure that diode 37 is always off for input voltage values that are no greater than the minimum threshold voltage of circuit 41, resistors 33 and 35 shift the threshold voltage of circuit 28 to a value that is greater than the zener voltage of diode 37. For this example embodiment, resistors 33 and 35 shifted the threshold voltage of circuit 28 from the zener voltage to voltages of 5.4 to 6.6 volts with a typical value of 6.0 volts. The value of resistors 44 and 45 in addition to the voltage from reference 48 were selected to provide circuit 41 a typical threshold voltage of approximately 5.5 volts. Due to process variations, the minimum and maximum values were about 5.3 and 5.7 volts, respectively. The delay time through circuit 41 allowed circuit 41 to respond prior to circuit 28 to an input voltage change from the target value to no less than the threshold value of circuit 41 over a time interval that was no less than about three (3) microseconds. For changes in the input voltage from the target value to no less than the threshold voltage of circuit 28 that occurred in a time interval less than about three (3) microseconds, circuit 28 responded to the input voltage change prior to circuit 41.

The use of the word substantially or about means that a value is expected to be very close to a stated value herein. However, as is well known in the art there are always minor variances that prevent the values from being exactly as stated. It is well established in the art that variances of up to about ten percent (10%) are regarded as reasonable variances from the ideal goal of being exactly as described herein.

In order to facilitate this functionality for circuit 20, a source of transistor 21 is connected to terminal 11, a drain of transistor 21 is connected to output 13, and a gate is commonly connected to a first terminal of resistor 24 and a drain of transistor 22. A second terminal of resistor 24 is connected to terminal 12. A source of transistor 22 is connected to terminal 11 and a gate is commonly connected to a first terminal of resistor 23 and node 50. A second terminal of resistor 23 is connected to terminal 11. A first terminal of resistor 31 is commonly connected to a source of transistor 30 and terminal 11. A second terminal of resistor 31 is commonly connected to a first terminal of resistor 33 and a drain of transistor 30. A gate of transistor 30 is connected to node 50. A second terminal of resistor 33 is connected to a cathode of diode 37. An anode of diode 37 is commonly connected to a base of transistor 39 and a first terminal of resistor 35. A second terminal of resistor 35 is commonly connected to an emitter of transistor 39 and terminal 12. A collector of transistor 39 is connected to node 50. A first terminal of resistor 44 is connected to terminal 11 and a second terminal of resistor 44 is commonly connected to a non-inverting input of comparator 49 and a first terminal of resistor 45. A second terminal of resistor 45 is connected to terminal 12. An inverting input of comparator 49 is connected to receive the reference voltage from reference 48. An output of comparator 49 is connected to a gate of transistor 42. A drain of transistor 42 is connected to node 50 and a source is connected to terminal 12.

Figure 4:
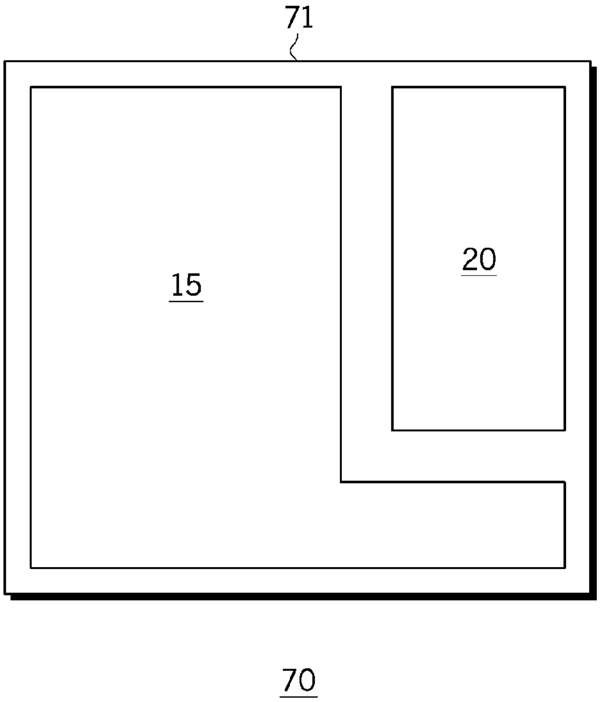
FIG. 4 schematically illustrates an enlarged plan view of a semiconductor device that includes the power system of FIG. 1 in accordance with the present invention.

FIG. 4 schematically illustrates an enlarged plan view of a portion of an embodiment of a semiconductor device or integrated circuit 70 that is formed on a semiconductor die 71. Circuit 20 is formed on die 71. In most embodiments, load 15 is also on die 71 along with circuit 20. Die 71 may also include other circuits that are not shown in FIG. 4 for simplicity of the drawing. Circuit 20 and device or integrated circuit 70 are formed on die 71 by semiconductor manufacturing techniques that are well known to those skilled in the art.

In view of all of the above, it is evident that a novel device and method is disclosed. Included, among other features, is forming a an over-voltage protection circuit to have one circuit that protects the output voltage from input voltages that change at a first rate and a second circuit that protects the output voltage from input voltages that change a second rate that is less than the first rate. Additionally, configuring the second circuit to have a lower threshold voltage than the first circuit provides the over-voltage protection circuit more accurate control of the input voltage values that are coupled to the output voltage.

While the subject matter of the invention is described with specific preferred embodiments, it is evident that many alternatives and variations will be apparent to those skilled in the semiconductor arts. More specifically the subject matter of the invention has been described for a particular PNP transistors P-channel MOS transistors although other MOS and/or bipolar transistors may be used, as well as to BiCMOS, metal semiconductor FETs (MESFETs), HFETs, and other transistor structures. Additionally, the word "connected" is used throughout for clarity of the description, however, it is intended to have the same meaning as the word "coupled".

The invention claimed is:

1. An over-voltage protection circuit comprising:

an input configured to receive an input voltage;

an output;

a pass element transistor coupled between the input and the output and configured to couple the input voltage to the output;

a first circuit configured to disable the pass element transistor responsively to the input voltage being no less than a first value, the first circuit coupled to receive the input voltage and including a zener diode coupled to receive the input voltage, the first circuit including a resistor coupled in series with the zener diode and also including a another transistor coupled in parallel to the resistor wherein the first circuit is configured to enable the another transistor responsively to the input voltage being no less than the first value; and a second circuit configured to disable the pass element transistor responsively to the input voltage being no less than a second value that is less than the first value, the second circuit coupled in parallel with the first circuit to receive the input voltage.

2. The over-voltage protection circuit of claim 1 wherein the second circuit includes a comparator configured to receive a sense signal that is representative of the input voltage and form a control signal used to disable the pass element transistor wherein the comparator is configured to form the control signal responsively to the input voltage being no less than second value.

3. The over-voltage protection circuit of claim 2 further including a feed forward circuit coupled to receive the input, voltage and form the sense signal.

4. The over-voltage protection circuit of claim 2 further including a first resistor coupled to enable the pass element transistor.

5. The over-voltage protection circuit of claim 1 further including a threshold shifting circuit coupled to the zener diode.

6. The over-voltage protection circuit of claim 1 further including a first transistor coupled to the zener diode and to a threshold shifting circuit and configured to form a control signal used to disable the pass element transistor responsively to the input voltage being no less than the first value.

7. The over-voltage protection circuit of claim 1 wherein an output of the first circuit is connected to an output of the second circuit.

8. The over-voltage protection circuit of claim 1 wherein the zener diode has an anode and a cathode, and further including a first transistor having a first current carrying electrode coupled to the pass element transistor, a control electrode coupled to the anode of the zener diode, and a second current carrying electrode coupled to a voltage return. of the over-voltage protection circuit.

9. The over-voltage protection circuit of claim 8 further including a first resistor having a first terminal coupled to the control electrode of the first transistor and a second terminal coupled to the voltage return, and also including a second resistor having a first terminal coupled to receive the input voltage and a second terminal coupled to the cathode of the zener diode.

10. The over-voltage protection circuit of claim 1 wherein the second circuit includes a comparator having a non-inverting input, an inverting input, and an output, and also including a first transistor having a control electrode coupled to the output of the comparator, a first current carrying electrode coupled to a voltage return of the over-voltage protection circuit, and a second current carrying electrode coupled to the pass element transistor.

11. The over-voltage protection circuit of claim 10 wherein the second circuit includes a feed-forward circuit coupled to receive the input voltage and couple a sense signal to the non-inverting input of the comparator wherein the sense signal is representative of the input voltage.

12. The over-voltage protection circuit of claim 1 wherein the first circuit including the zener diode is configured to disable the pass element transistor before the second circuit responsively to the input voltage being greater than the second value and no less than the first value for input voltage transitions having a rate that is greater than a first rate and where in the second circuit is configured to disable the pass element transistor before the first circuit responsively to the input voltage being no less than the second value for input voltage transitions having a rate that is less than the first rate.

13. A method of forming an over-voltage protection circuit comprising:

configuring a pass element of the over-voltage protection circuit to couple an input, voltage to an output of the over-voltage protection circuit;

coupling a first circuit of the over-voltage protection circuit to receive the input voltage and configuring the first circuit to decouple the input voltage from the output responsively to a first value of the input voltage for the input voltage increasing at a first rate;

coupling a second circuit of the over-voltage protection circuit in parallel with the first circuit to receive the input voltage and configuring the second circuit to decouple the input voltage from the output responsively to the input voltage increasing to no less than a second value at a second rate wherein the second value is greater than the first value; and coupling an output of the first circuit and an output of the second circuit to a first transistor wherein both the first and second circuits disable the first transistor responsively to the input voltage having a value that is less than the first value and wherein disabling the first transistor causes the pass element to couple the input voltage to the output and also changes the second value to a third value that is less than the second value.

14. The method of claim 13 wherein configuring the second circuit of the over-voltage protection circuit includes configuring the second circuit to respond to the input voltage at a rate that is greater than the first circuit responds to the input voltage.

15. The method of claim 14 further including coupling a zener diode to receive the input voltage and to sense the input voltage increasing to the second value and responsively form a control signal that causes disabling the pass element.

16. The method of claim 15 further including coupling the zener diode to disable the pass element responsively to the second value.

17. The method of claim 13 wherein configuring the second circuit of the over-voltage protection circuit includes configuring the second rate to be greater than the first rate.

18. The method of claim 17 further including configuring a comparator of the first circuit to sense the first value after the second circuit senses the second value.

19. The method of claim 18 further including coupling a first input of the comparator to receive a sense signal that is representative of the input voltage, coupling a second input of the comparator to receive a reference signal, and coupling an output of the comparator to form a signal that causes disabling of the pass element.

* * * * *